United States Patent
Stein et al.

(10) Patent No.: US 9,732,748 B2
(45) Date of Patent: Aug. 15, 2017

(54) VALVE UNIT AND A FLUID WORKING MACHINE COMPRISING A VALVE UNIT

(71) Applicant: Artemis Intelligent Power Limited, Midlothian (GB)

(72) Inventors: Uwe Stein, Midlothian (GB); Jens Eilers, Midlothian (GB); Jack Lavender, Midlothian (GB); Stephen Laird, Midlothian (GB)

(73) Assignee: ARTEMIS INTELLIGENT POWER LIMITED, Loanhead (GB)

( * ) Notice: Subject to any disclaimer, the term of this patent is extended or adjusted under 35 U.S.C. 154(b) by 0 days.

(21) Appl. No.: 14/771,103

(22) PCT Filed: Mar. 3, 2014

(86) PCT No.: PCT/GB2014/050623
§ 371 (c)(1),
(2) Date: Aug. 27, 2015

(87) PCT Pub. No.: WO2014/132089
PCT Pub. Date: Sep. 4, 2014

(65) Prior Publication Data
US 2016/0003239 A1     Jan. 7, 2016

(30) Foreign Application Priority Data

Mar. 1, 2013   (GB) .................................. 1303741.1

(51) Int. Cl.
*F16K 11/00* (2006.01)
*F04B 53/10* (2006.01)
(Continued)

(52) U.S. Cl.
CPC .......... *F04B 53/1087* (2013.01); *F01B 29/10* (2013.01); *F01B 31/26* (2013.01);
(Continued)

(58) Field of Classification Search
None
See application file for complete search history.

(56) References Cited

U.S. PATENT DOCUMENTS

| | | | | |
|---|---|---|---|---|
| 1,441,508 A * | 1/1923 | Jensen | ...................... | F04B 1/02 417/517 |
| 3,702,624 A * | 11/1972 | Fries | ..................... | F04B 53/109 137/512 |
| 3,807,909 A * | 4/1974 | St. Clair | ................. | F04B 15/02 222/380 |
| 5,358,383 A * | 10/1994 | Eisenbacher | ........ | F02M 37/043 417/273 |
| 5,662,461 A | 9/1997 | Ono | | |
| 6,722,862 B2 * | 4/2004 | Hartnagel | ............. | F04B 7/0015 417/416 |
| 7,328,688 B2 | 2/2008 | Savage et al. | | |

(Continued)

FOREIGN PATENT DOCUMENTS

| | | |
|---|---|---|
| CN | 101784828 A | 7/2010 |
| DE | 10 2005 038215 A1 | 11/2006 |

(Continued)

OTHER PUBLICATIONS

International Search Report for corresponding International PCT Application No. PCT/GB2014/050623, dated Jun. 24, 2014.

*Primary Examiner* — John Fox
(74) *Attorney, Agent, or Firm* — Hauptman Ham, LLP

(57) ABSTRACT

A valve unit for regulating the flow of working fluid between a working chamber of a fluid working machine and both a first working fluid line and second working fluid line, the valve unit comprising: a first valve comprising a first valve member and one or more cooperating first valve seats, a second valve comprising a second valve member and one or more cooperating second valve seats, an actuator coupled to both the first and second valve members through which a force may be applied to urge the first valve member open or closed and to urge the second valve member open or closed, a coupling between the actuator and the first valve member, wherein the coupling between the actuator and the first valve member comprises a connector which extends at least partially through the second valve member.

24 Claims, 10 Drawing Sheets

(51) Int. Cl.
*F04B 7/00* (2006.01)
*F16K 31/08* (2006.01)
*F16K 31/06* (2006.01)
*F01B 29/10* (2006.01)
*F01B 31/26* (2006.01)
*F04B 19/22* (2006.01)
*F16K 11/04* (2006.01)

(52) U.S. Cl.
CPC .......... *F04B 7/0003* (2013.01); *F04B 7/0011* (2013.01); *F04B 7/0076* (2013.01); *F04B 19/22* (2013.01); *F04B 53/1082* (2013.01); *F16K 11/04* (2013.01); *F16K 31/0634* (2013.01); *F16K 31/082* (2013.01)

(56) References Cited

U.S. PATENT DOCUMENTS

| | | |
|---|---|---|
| 2004/0202552 A1 | 10/2004 | Okii et al. |
| 2011/0061749 A1 | 3/2011 | Okamoto |

FOREIGN PATENT DOCUMENTS

| | | |
|---|---|---|
| JP | H05 180369 | 7/1993 |
| JP | H07 144629 A | 6/1995 |
| WO | 2013018146 A1 | 2/2013 |
| WO | 2013118180 A1 | 8/2013 |

* cited by examiner

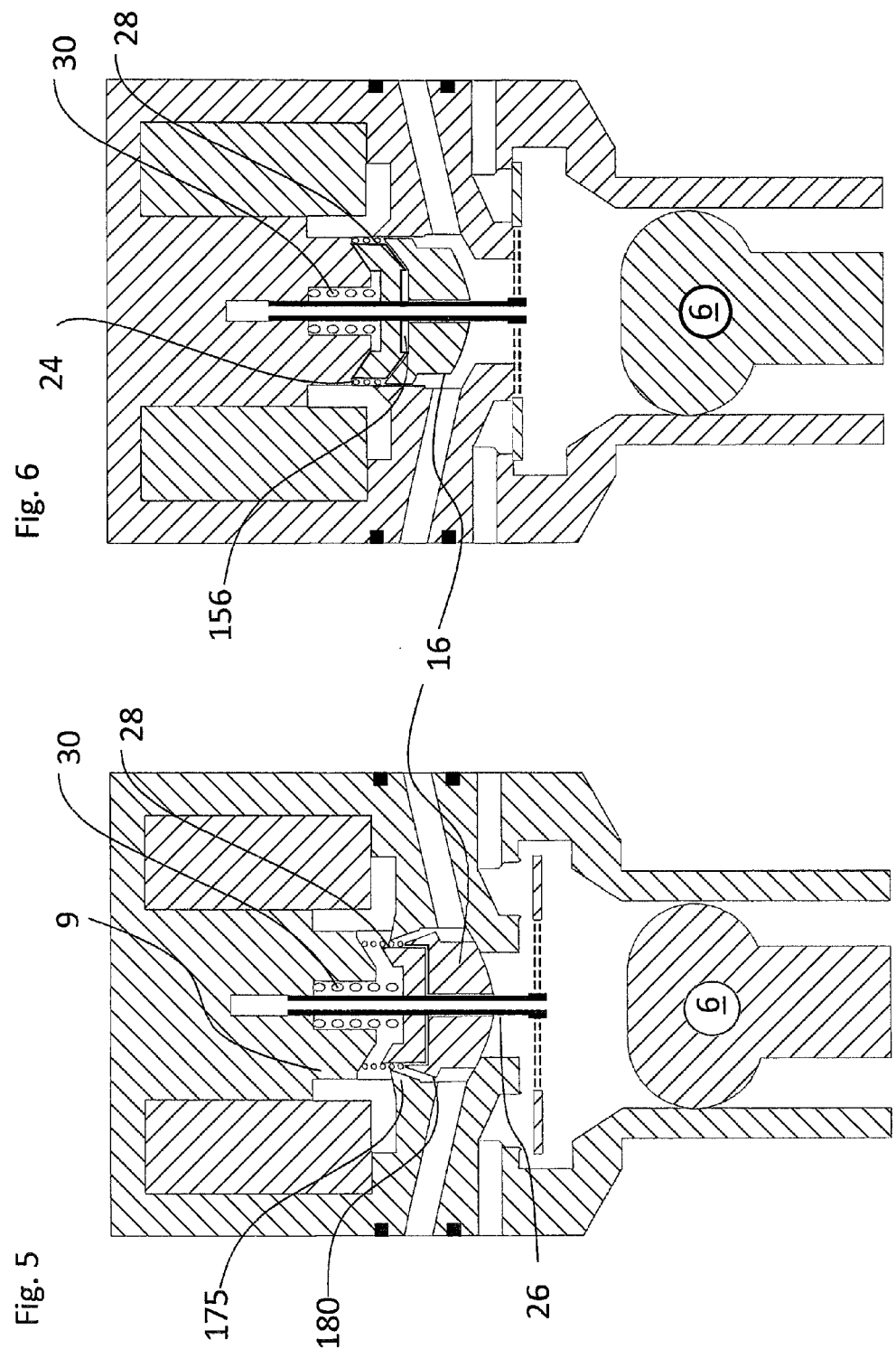

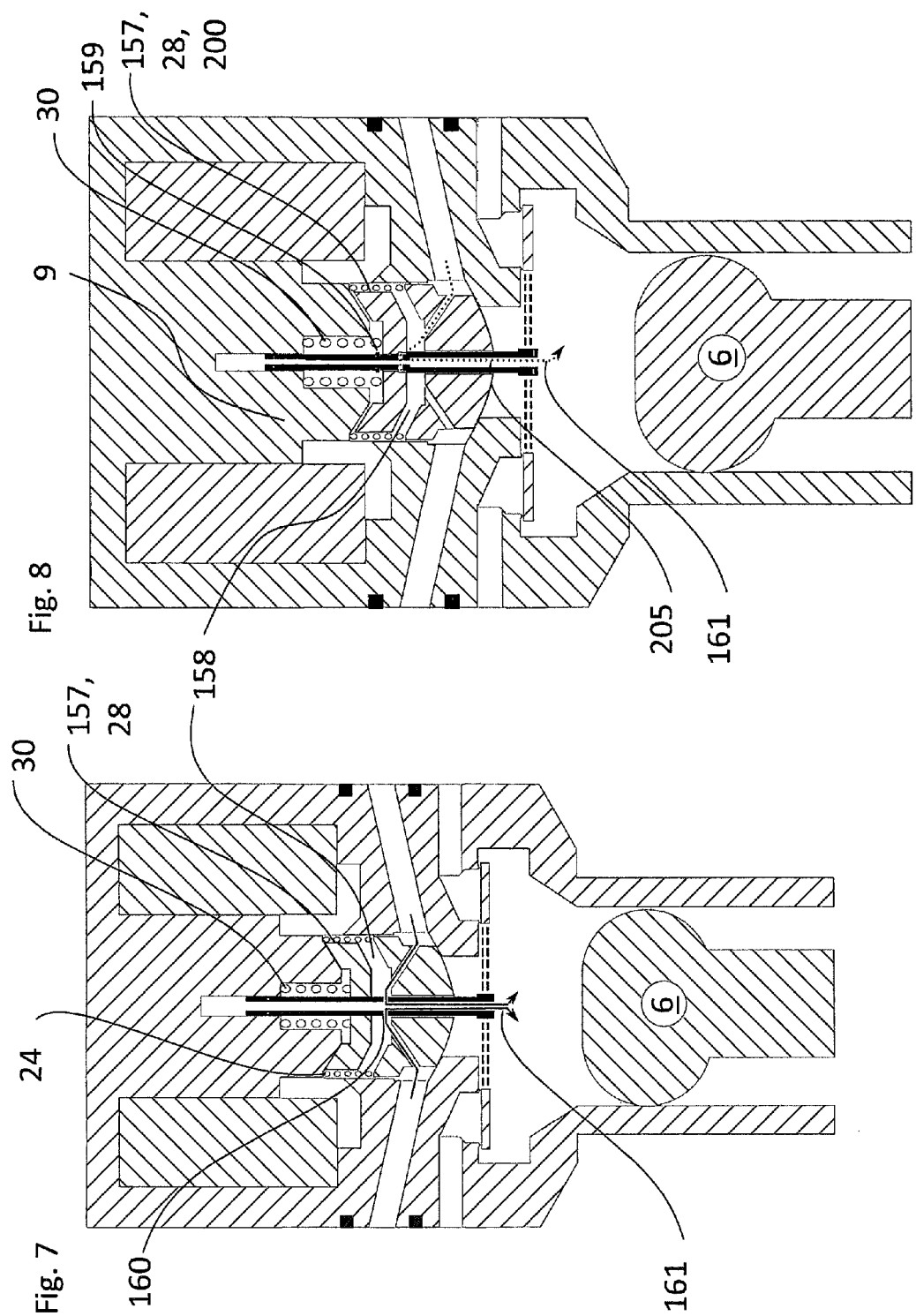

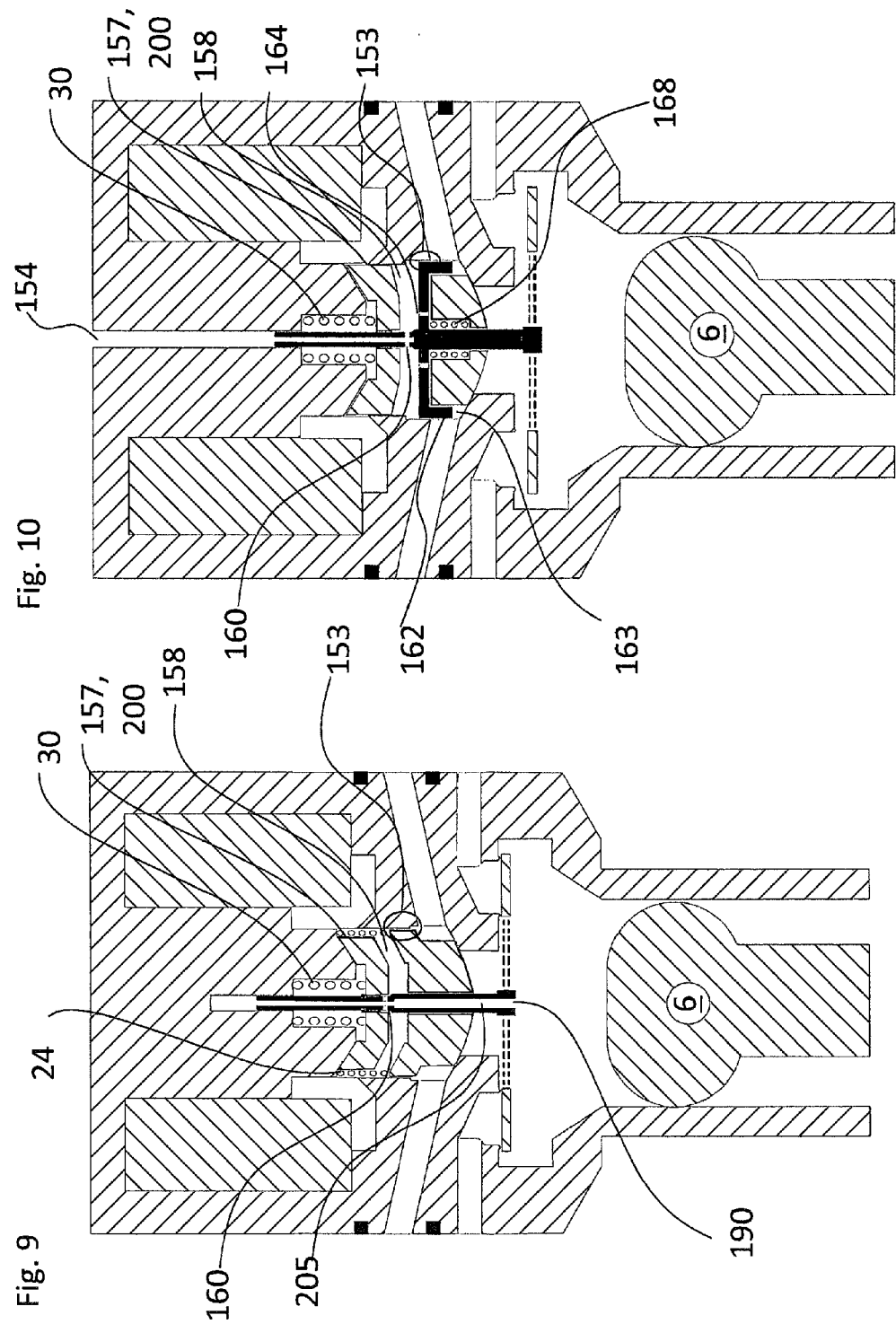

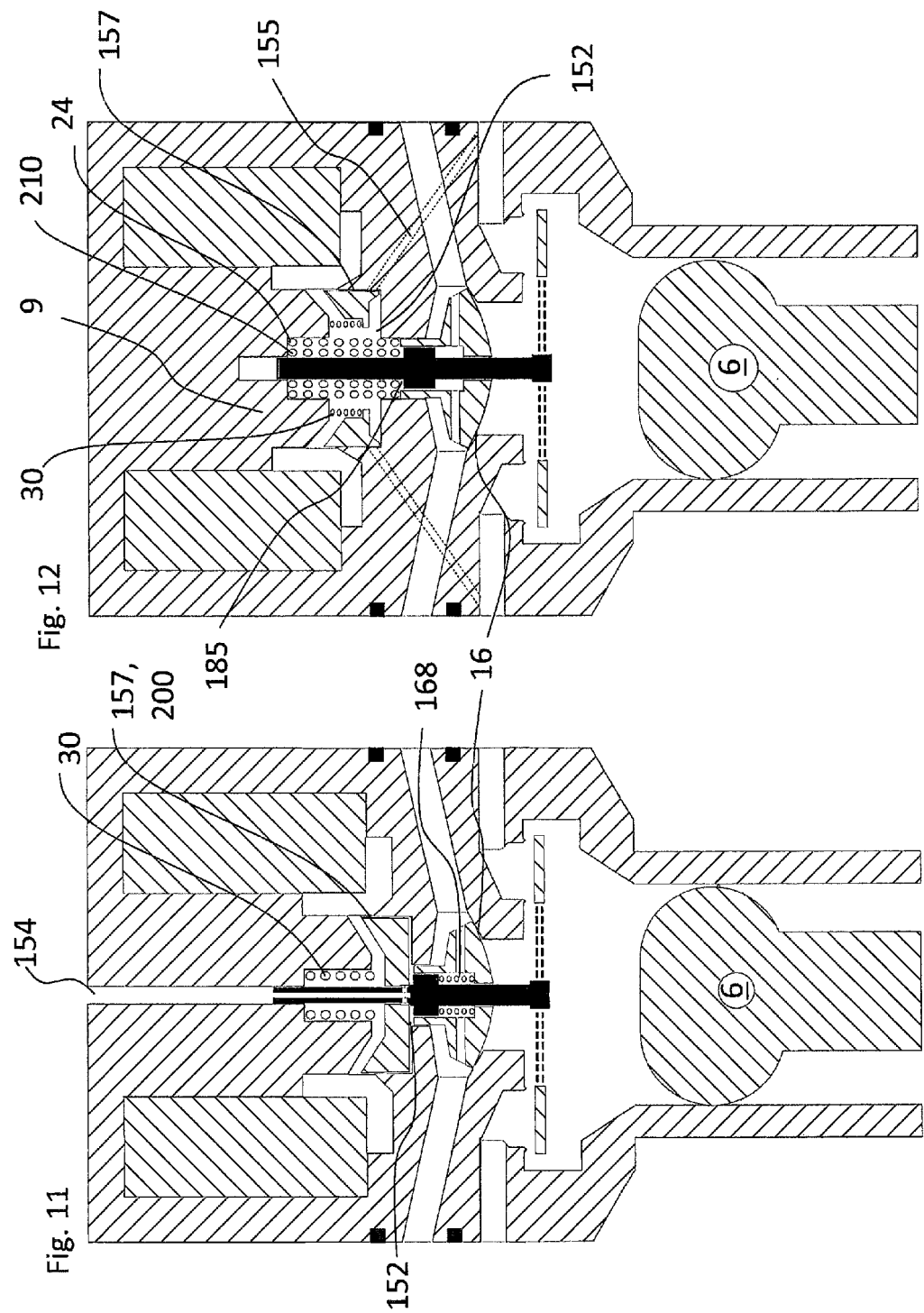

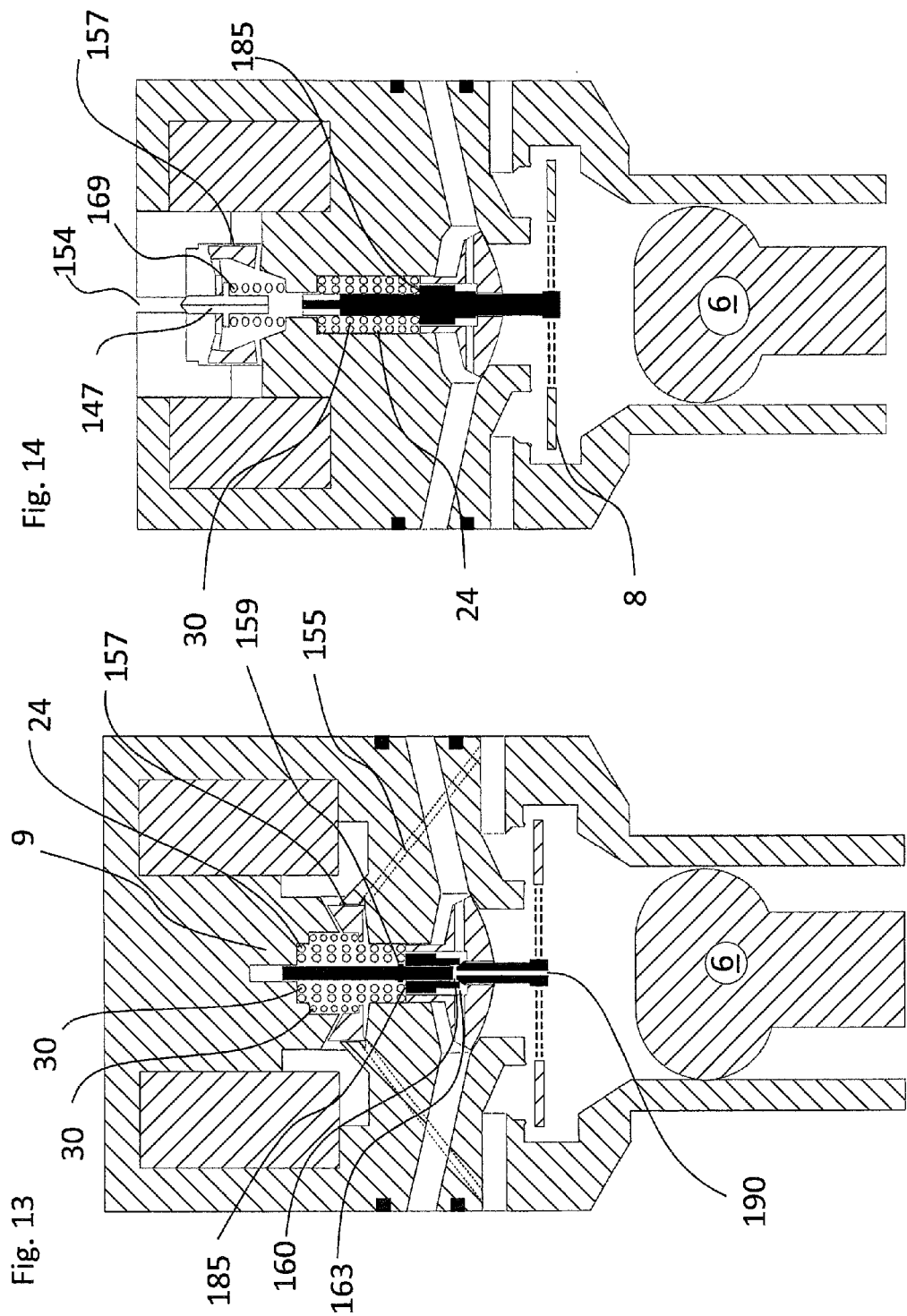

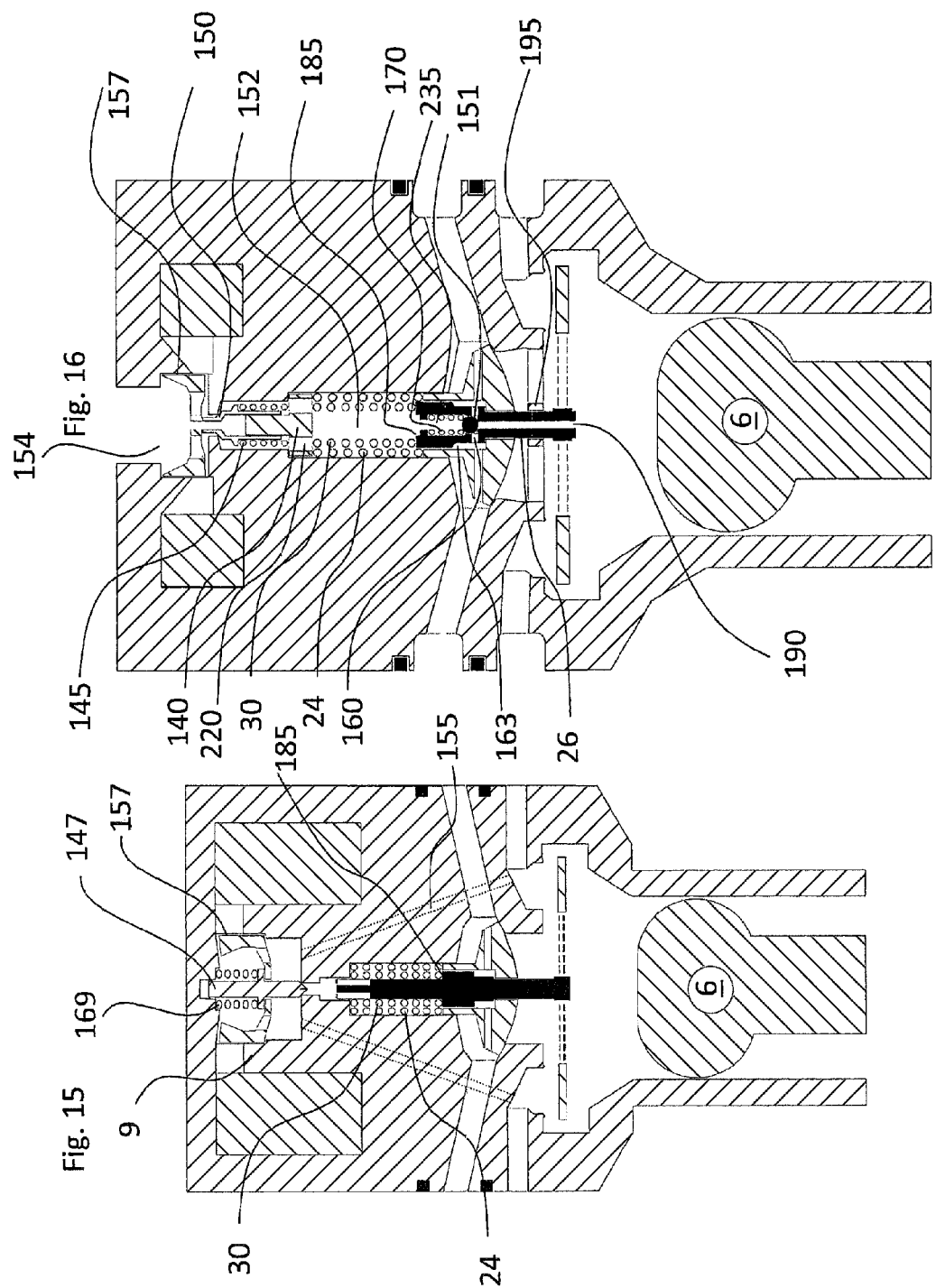

VALVE UNIT AND A FLUID WORKING MACHINE COMPRISING A VALVE UNIT

FIELD OF THE INVENTION

The invention relates to a valve unit comprising first and second valve members, the second of which is typically an annular valve. The valve unit has an actuator which is actuatable to apply a force to urge the first valve member open or closed and to urge the second valve member open or closed.

BACKGROUND TO THE INVENTION

Fluid working machines, such as pumps, motors and machines which are operable as a pump or a motor in alternative operating modes, include low and high pressure fluid lines and working chambers of cyclically varying volume (such as piston cylinders). Pumps receive working fluid from the low pressure fluid line, do work to pressurise it and deliver it to the high pressure fluid line; motors receive pressurised working fluid from the high pressure line, use it to do work, and deliver the depressurised fluid to the low pressure line. Valves employed to regulate the flow of working fluid between the low and high pressure fluid lines and the working chamber are referred to herein as low and high pressure valve respectively.

The invention concerns actuated valves, in which an actuator urges the low and high pressure valves to open or close as appropriate. Such valves are useful for fluid working machines such as those disclosed in EP0361927 and EP0494236, which are machines in which electronically controlled valves are actively controlled in phased relation to cycles of working chamber volume by a controller to determine the net displacement of working fluid by each working chamber during each cycle of working chamber volume.

WO2013018146 A1 (Mitsubishi Heavy Industries, Ltd.) discloses a pair of valve members influenced by a single solenoid coil. The invention of the present application also employs a single actuator to influence a pair of valve members, however the inventive aspect is the physical arrangement of internal components leading to a more compact valve.

Machines of this type are useful in applications such as industrial, automotive, renewable power generation or vehicles, where it is important that the machines be compact and low cost. It is advantageous to provide a valve unit comprising both the low and high pressure valves.

It is also advantageous to provide a valve unit in which the low and high pressure valves are both actuated by the same actuator (e.g. a single solenoid). This is advantageous because it reduces the complexity of the valve unit, and its size, and can increase reliability. By positioning the armatures closer to the solenoid than in previous designs, the present invention reduces the length of magnetic paths, hence reducing losses and increasing efficiency.

The invention concerns improvements to the structure of such a valve unit, which have advantages including one or more of simplifying manufacture, increasing reliability, making the valve unit more compact for a given flow capacity, reducing the total dead space of the resulting machine (i.e. the volume of working fluid between the working chamber and the valves, when both valves are closed and when the working chamber is at its minimum volume), and reducing magnetic losses (and therefore improving energy efficiency).

SUMMARY OF THE INVENTION

According to a first aspect of the invention there is provided a valve unit for regulating the flow of working fluid between a working chamber of a fluid working machine and both a first working fluid line and a second working fluid line, the valve unit comprising:

a first valve comprising a first valve member and one or more cooperating first valve seats, a second valve comprising a second valve member and one or more cooperating second valve seats, an actuator, which is actuatable to apply a force to urge the first valve member away from or towards the one or more first valve seats (i.e. to an open or closed position respectively) and a force to urge the second valve member away from or towards the one or more second valve seats (i.e. to an open or closed position respectively), a coupling between the actuator and the first valve member, wherein the coupling comprises a connector which extends at least partially through (typically, which extends through) the second valve member.

By providing a coupling from the actuator to the first valve member which extends through the second valve member the valve can be made more compact. In particular, the volume defined by the valve unit between a working chamber to which the valve unit is connected in use and the one or more first and second valve seats (that is to say, the dead volume of working fluid which is present between the valve seats and the working chamber when both valves are closed) can be reduced because an actuator for the first valve member need not be accommodated between the second valve member and the working chamber. Typically the actuator is coupled to the second valve member. The actuator may be coupled to the second valve member through a magnetic circuit.

The valve unit may further comprise an opening in the valve unit through which the first valve and the second valve can communicate with a working chamber, and wherein the first valve member comprises an aperture through which the second valve can communicate with the opening (and thereby a working chamber) when the first valve member is in sealing contact with the one or more first valve seats.

The connector is typically a mechanical connector, such as a connecting rod. The armature (the first armature) may be integral with the connector. In some embodiments, the connector comprises a conduit which extends through both the (first) armature and the first valve member to thereby equalise pressure.

In some embodiments the connector may comprise a hydraulic connector. A hydraulic connector may for example comprise first and second slidable members and a chamber retaining a body of hydraulic fluid extending therebetween such that the first and second slidable members make corresponding movements. The first slidable member may be the said (first) armature, or a part which is connected to and slides with the (first) armature. The second slidable member may be the first valve member or a part which is connected to and slides with the first valve member. Said chamber may be a closed volume, although there may also be one or more apertures through which there may be leakage of hydraulic fluid into or out of the chamber. Thus, armature force may be transferred via this body of hydraulic fluid to the first valve member. The first valve member is typically a low pressure valve (i.e. a valve regulating the flow of hydraulic fluid between a working chamber and a low pressure fluid line). The first working fluid line is typically a low pressure fluid line. Although leakage may occur, the springs on the respective members are typically balanced such that the volume is set appropriately for low pressure valve opening and closing. The chamber may be fed by leakage via/around existing components, or by separate fluid passage. An advantage of such a hydraulic connector is that there is a certain resilience in the connection, removing or reducing the risk of a failure of a connecting rod severing due to fatigue failure.

The opening of the valve unit is coupled to a working chamber in operation. The opening may for example be a plain aperture, a threaded aperture etc.

The provision of an aperture in the first valve member provides a path for working fluid to flow to or from the second valve even when the first valve is closed (i.e. the first valve member is in sealing contact with the one or more first valve seats). This further enables provision of a compact valve. The second valve member is typically a high pressure valve (i.e. a valve regulating the flow of hydraulic fluid between a working chamber and a high pressure fluid line. The second working fluid line is typically a high pressure fluid line. By high and low pressure we refer to relative pressure).

In use, the one or more first valve seats are typically coupled to the first working fluid line (typically via a gallery extending around the valve unit) and the one or more second valve seats are typically coupled to the second working fluid line (typically via a gallery extending around the valve unit).

By fluidly coupling the working chamber to the second working fluid line, via the first valve member, the first working fluid line may be located closest to the working chamber, and the crankcase. This proximity helps to reduce the length of working fluid lines, and in the instance of the working fluid lines arranged the other way around, avoids such complex interwoven drill ways resulting from this arrangement. Furthermore, the fluid connections to the first and second valve seats from the first and second working fluid lines can be axially spaced, simplifying manufacture.

Typically the first working fluid line is a low pressure fluid line and the second working fluid line is a high pressure fluid line. The low pressure line may preferably be located closer to the crankcase such that in certain embodiments, it may lead directly to the crankcase (this is an alternative arrangement to the low pressure line being in fluid communication with a dedicated low pressure reservoir). The crankcase then becomes a main low pressure reservoir of working fluid for the valve unit, and fluid working machine. If the high pressure line is instead closer to the working chamber than the low pressure line, it is difficult or impossible to connect the low pressure line to crankcase, to allow 'crankcase breathing'.

Typically, the first valve member is located intermediate the second valve member and the opening.

The second valve member may be located intermediate the first valve member and the actuator.

The actuator may be a solenoid actuator. The solenoid actuator typically acts on an armature (typically, the first armature and in some embodiments also a second armature). The (first) armature is preferably connected (typically fixedly) to the first valve member by a connector which extends through the second valve member. The connector is typically coaxial with the second valve seat.

The actuator may however be another type of actuator, for example a piezo-electric, hydraulic or pneumatic actuator.

It may be that the solenoid actuator acts on a (first) armature, the (first) armature is connected to the first valve member by a connector which extends through the second valve member, and the (first) armature is magnetically coupled to the solenoid actuator such that when current is passed through the solenoid actuator, magnetic flux from the solenoid actuator passes through the (first) armature and an opening or closing force is thereby exerted on the first valve member through the connector.

The said force is typically a closing force which urges the (first) armature and thus the first valve member towards the one or more first valve seats. However, it may be an opening force which urges the first valve member away from the one or more first valve seats.

The force exerted on the first valve member by the solenoid actuator is typically transmitted through the actuator and not by magnetic forces acting directly on the first valve member.

The first valve member may be formed entirely of non-magnetic material.

It may be that the second valve member comprises magnetic material forming an armature (the second armature) and is magnetically coupled to the solenoid actuator such that when current is passed through the solenoid actuator, magnetic flux from the solenoid actuator passes through the (second) armature and an opening or closing force is thereby exerted on the second valve member (typically concurrently with force being exerted on the other (the first) armature (which is connected to the first valve member)).

The path of magnetic flux meeting, and passing axially through the (second) armature is of particular interest. The axial flux has potential to produce axial force, which then moves the second valve member axially. The flux paths are directly influenced by the design, and the magnetic circuit guiding the flux is determined by proximity of magnetic/non-magnetic components/fluid gaps, their respective shapes, and overlaps of adjacent parts. Energisation of the solenoid coil may lead to the (second) armature being attracted towards the annular sealing piece 34 (shown in FIG. 1) in a direction away from the solenoid core 9, or in a direction towards the solenoid core 9 (shown in FIG. 2). FIG. 2 shows an embodiment with the (second) armature member being pulled into a fluid void between two magnetic portions. This arrangement provides a greater 'grab' force, which is a distant force of attraction pulling the (second) armature.

The said force is typically an opening force which urges the (second) armature and thus the second valve member away from the one or more second valve seats. However, it may be a closing force which urges the (second) armature and thus the second valve member towards the one or more second valve seats.

It may be that the solenoid actuator acts on a (first) armature, the (first) armature is coupled to a hydraulically actuated member through a hydraulic pressure operated coupling, and the hydraulically actuated member is coupled to (typically connected to) the first valve member by the connector.

By a hydraulic pressure operated coupling we refer to a coupling in which the movement of an armature leads to a change in the pressure of a body of hydraulic fluid which in turn leads to movement of the hydraulically actuated member. This includes the possibility that the there is a substantially closed body of hydraulic fluid between the (first)

armature and the hydraulically actuated member so that the (first) armature and hydraulically actuated member make corresponding movements to maintain the volume in the body of hydraulic fluid and also includes the possibility that movement of the (first) armature actuates a mechanism, for example the opening of a valve connecting a body of hydraulic fluid to source or sink of hydraulic fluid, which has the effect of changing the pressure in the body of hydraulic fluid and thereby moving the hydraulically actuated member.

Thus, it may be that the valve unit comprises a chamber defining a volume containing hydraulic fluid, a sink or source of hydraulic fluid and a valve regulating the connection of the chamber to the sink or source of hydraulic fluid, wherein the actuator opens the valve to thereby apply a force to urge the first valve member away from or towards the one or more first valve seats and a force to urge the second valve member away from or towards the one or more second valve seats. The actuator may be a solenoid actuator which acts on a (first) armature which is slidably mounted to thereby open the valve.

It may be that the sink or source of hydraulic fluid is a connection to the first or second working fluid line (as appropriate, i.e. where the first and second working fluid lines are low and high pressure fluid lines respectively, a connection to the first working fluid line may be the sink of hydraulic fluid and a connection to the second working fluid line may be the source of hydraulic fluid, where applicable).

In some embodiments, the sink or source of hydraulic fluid is a conduit, through the connector and first valve member, to the said opening (and thus to the working chamber in use). Thus, the valve regulating the connection of the chamber to the sink or source of hydraulic fluid may be a pilot valve, the opening of which (typically due to a solenoid actuator acting on an armature and opening a valve connecting the chamber to the said conduit) causes the pressure in the chamber to equilibrate with the pressure at the opening (and therefore the working chamber pressure in use). It may be that said pilot valve is biased closed. In some embodiments, the pilot valve is a check valve, such as a check ball valve. In some embodiments, the said conduit also extends through the (first) armature.

It may be that the valve unit comprises a chamber defining a volume containing hydraulic fluid, the chamber being defined in part by a surface of the hydraulically actuated member, the hydraulically actuated member being slidably mounted, whereby movement of the (first) armature responsive to actuation by the solenoid leads to a decrease (or increase) in hydraulic pressure within the chamber and a consequent movement of the hydraulically actuated member.

It may be that the hydraulically actuated member slides into the chamber in response to the decrease (or outwards from the chamber in response to an increase) in hydraulic pressure within the chamber. The decrease (or increase) in hydraulic pressure typically leads to a net hydraulic force in the direction into (or out of, respectively) the chamber due to a pressure differential across the hydraulically actuated member. However, there may be embodiments in which the hydraulically actuated member is biased towards the chamber (or away from, respectively), for example, by an elastic member such as a spring, so that although it decreases (increases, respectively) due to the decrease in hydraulic pressure in the chamber, the net hydraulic force on the hydraulically actuated member remains in the direction away from (towards, respectively) the chamber but the hydraulically actuated member anyway moves into (out of, respectively) the chamber.

It may be that the chamber is in communication with a sink for hydraulic fluid (or source of hydraulic fluid) through a valve and the (first) armature is slidable responsive to actuation by the solenoid to open the valve, to thereby cause hydraulic fluid to leave the chamber (or to enter the chamber respectively) and a pressure differential to develop across the hydraulically actuated member.

The said valve may for example be a spool valve, or a poppet valve. The said valve may have a sealing end which is operable to form a seal between the chamber and the said sink (or source) of hydraulic fluid and a non-sealing end which is in contact with hydraulic liquid in the chamber, wherein the cross-sectional area of the sealing region of the sealing end is the same as the cross-sectional area of the non-sealing end which is in contact with the hydraulic liquid (the cross-sections are in planes perpendicular to the direction in which the valve moves).

The chamber may be formed between the hydraulically actuated member and the (first) armature. The chamber may be defined in part by a surface of the (first) armature, or a moveable member, movement of which is coupled to movement of the (first) armature. The hydraulically actuated member may move into a volume initially occupied by the (first) armature. The second valve member may move into a volume initially occupied by the hydraulically actuated member.

It may be that the solenoid actuator acts on an armature (the first armature) and the (first) armature is coupled to the second valve member through a hydraulic pressure operated coupling.

It may be that the second valve member is slidably mounted and has a surface in communication with a chamber containing hydraulic fluid, wherein movement of the (first) armature causes a reduction (or increase) in the pressure of hydraulic fluid in the chamber (for example, by opening a valve to a sink of hydraulic fluid (or source of hydraulic fluid respectively)), the reduction (or increase) in pressure causing said urging of the second valve member away from or towards the one or more second valve seats.

It may be that the second valve member is slidably mounted and has a surface in fluid communication with a chamber containing hydraulic fluid, wherein movement of the first valve member or the connector causes a reduction (or increase) in the pressure of hydraulic fluid in the chamber, the reduction (or increase) in pressure in turn urging the second valve member away from or towards the one or more second valve seats.

It may be that the second valve member slides into the chamber in response to the decrease (or slides outwards from in response to the increase in) hydraulic pressure within the chamber. The decrease (or increase, respectively) in hydraulic pressure typically leads to a net hydraulic force in the direction into the chamber. However, there may be embodiments in which the second valve member is biased towards (or away from, respectively) the chamber, for example, by an elastic member such as a spring, so that although the biasing decreases due to the decrease (or increase, respectively) in hydraulic pressure in the chamber, the net hydraulic force on the second valve member remains in the direction away from (or towards, respectively) the chamber but the second valve member anyway moves into (or outwards from respectively) the chamber. Ie the net force is important, not just the hydraulic force.

It may be that the chamber is in communication with a sink for hydraulic fluid (or source of hydraulic fluid) through a valve and the (first) armature is slidable responsive to actuation by the solenoid to open the valve, to thereby cause hydraulic fluid to leave the chamber (or to enter the chamber respectively) and a pressure differential to develop across the second valve member. The said valve may for example by a spool valve, or a poppet valve. The said valve may have a sealing end which is operable to form a seal between the chamber and the said sink (or source) of hydraulic fluid and a non-sealing end which is in contact with hydraulic liquid in the chamber, wherein the cross-sectional area of the sealing region of the sealing end is the same as the cross-sectional area of the non-sealing end which is in contact with the hydraulic liquid, perpendicular to the direction in which the valve moves.

The chamber may be formed between the second valve member and the (first) armature. The second valve member may move into a volume initially occupied by the (first) armature.

It may be that there is a fluid connection between the chamber and the second working fluid line (typically high pressure fluid line) through a throttle (i.e. a restricted flow region). This enables pressure of hydraulic fluid in the chamber to drop to below the pressure in the second working fluid line to facilitate movement of the second valve member and/or hydraulically actuated member, where present, but also allows pressurised hydraulic fluid to return to the chamber over time to reset the mechanism. The throttle may comprise a gap between the second valve member and a passage within which the second valve member slides, or a gap between the hydraulically actuated member, where present, and a passage within which the hydraulically actuated member slides.

Typically, the valve unit has a longitudinal axis, which is parallel to an axial direction defined by the valve unit.

It may be that the one or more first and one or more second valve seats are coaxial. The one or more first valve seats may be concentric with the one or more second valve seats.

It may be that the first and/or second valve member has two valve seats, which seal a port or ports lying between the two seats. Typically, the second valve member seals axially against a second valve seat at a radially outward region, and at a radially innermost region. The second valve member may slide around or within a guide.

It may be that the first and/or second valve member is an annular valve member. The characteristics of an annular valve are typically that a continuous sealing line isolates a radially inner region (radially inward of the sealing line) from an outer region (radially outward of the sealing line). In the instance of two continuous sealing lines, typically a radially outward region (radially outward of the outer sealing line) is coupled to the same pressurised region as a radially inward region (radially inward of the inner sealing line), and isolated from the intermediate region (between the two sealing lines).

In an embodiment with the single sealing line arrangement of annular valve, the corresponding portion of the valve body comprises a fluid passage terminating at a region radially inwards of the sealing line.

In an embodiment with the arrangement of annular valve with two sealing lines, the corresponding portion of the valve body comprises a fluid passage terminating at the valve member intermediate region.

The fluid passage, or at least the entrance to the fluid passage, may be embodied by a single continuous annular void, the same void with strengthening spanning members, the same void with flow modifying spanning members, a number of 'kidney shaped' voids defined by intermediate spanning members, or other arrangement of series of ports or drillings with intermediate spanning members.

The sealing lines may alternately may be adapted to the configuration of the fluid passages, either exactly meeting the shape define by termination of the fluid passage at the boundary of the valve body, or alternatively loosely to match a single or multiple fluid passages. At present, the cheapest and fastest ridge shape to manufacture in order to define the sealing line(s) is a single circular, or pair of circular and concentric ridges. Although typically the seal is performed by a flat seat, and ridge like structure, it is clear to anyone skilled in the art that numerous alternative sealing mechanisms and configurations exist.

The first and second valve members may be located within the valve unit.

This contrasts with arrangements in which the first or second valve members are located on the exterior of the valve unit.

It may be the first valve member is located intermediate the one or more first valve seats and an opening in the valve unit (through which the valve unit is connected in use to a working chamber in a fluid-working machine) This can, for example, be seen in the embodiment of FIG. 2. Therefore, the first valve member may in some embodiments move away from the said opening 4 (away from the working chamber in use), towards the actuator, to seal.

The combination of this feature with the feature that the actuator connector extends through the second valve member, means that the one or more first valve seats can be more readily manufactured as they can be accessed through the said opening.

Typically, the one or more second valve seats are located intermediate the second valve member and the opening. Therefore, the second valve member typically moves towards the opening (towards the working chamber), and away from the actuator, to seal.

The valve unit may comprise one or more radially outwards extending flow passages for coupling one or more first valve seats to a hydraulic line and/or one or more radially outwards extending flow passages for coupling one or more second valve seats to a hydraulic line.

Radially outwards extending passages provide a compact configuration for connecting the first and second valve seats to hydraulic lines (typically the low pressure line and the high pressure line respectively). Typically, the radially outwards extending flow passages couple one or more first valve seats and/or one or more second valve seats to a hydraulic line by way of a gallery, which typically extends around the valve unit.

The first valve member may be an annular valve and the one or more first valve seats are an annular valve seat and the annular first valve member and the annular valve seat are configured to together define inner and outer sealing lines extending around the periphery of the annular first valve member and the annular valve seat when the annular first valve member is in sealing engagement with the annular valve seat.

For example, one of the annular first valve member and the annular valve seat may comprise an inner sealing ridge. One of the first annular valve member and the first annular valve seat may comprise an outer sealing ridge. The inner and outer sealing ridges may define the inner and outer sealing lines respectively when the first annular valve member is in sealing engagement with the first annular valve seat.

The coupling between the actuator and the first valve member may comprise a magnetic coupling. The coupling between the actuator and the second valve member may comprise a magnetic coupling.

The valve unit may be configured such that actuation of the actuator causes the first valve to open or close and subsequently causes the second valve to open or close. For example movement of one valve may change the magnetic circuit acting on the other valve, thus subsequently causing that other valve to be magnetically urged (moved).

The valve unit may be configured such that opening or closure of the first valve (that is to say the first valve member forming sealing contact with the one or more first valve seats) causes the forces exerted by the actuator on the second valve member, whether directly or indirectly, to increase to thereby facilitate subsequent opening or closing of the second valve.

The invention extends in a second aspect to a fluid working machine comprising a low pressure line, a high pressure line, a working chamber, and a valve unit according to any one preceding claim, wherein the first and second valves are in fluid communication with the working chamber and the first and second valve seats are coupled to the low and high pressure lines respectively to thereby regulate the flow of working fluid between the working chamber and the low and high pressure lines.

The valve unit may further comprise an opening in the valve unit through which the first valve and the second valve communicate with the working chamber, and wherein the first valve member comprises an aperture through which the second valve can communicate with the working chamber even when the first valve member is in sealing contact with the one or more first valve seats (i.e. the first valve member comprises an aperture through which the second valve can communicate with the working chamber, when the first valve member is open. Although, some flow is likely to pass in addition around the periphery of the first valve member (bypassing the aperture).

The working chamber may, for example, be defined by a piston and cylinder within which the piston is slidably mounted.

The low pressure line may be in fluid communication with the one or more first valve seats (e.g. through a low pressure fluid gallery extending around the valve body). The high pressure line may be in fluid communication with the one or more second valve seats (e.g. through a high pressure fluid gallery extending around the valve body).

The fluid working machine may comprise a controller which actively controls the actuator in phased relationship to cycles of working chamber volume to thereby determine the net displacement of working fluid by the working chamber on each cycle of working chamber volume, for example by the methods of EP0361927 and EP0494236. Cycles of working chamber volume may be coupled to rotation of a rotatable shaft and the fluid working machine may comprise a shaft position sensor and take into account signals from the shaft position sensor to control the actuator in phased relationship to cycles of working chamber volume. The fluid working machine is typically a pump, a motor, and/or a machine which is operable as a pump or a motor in alternative operating modes.

The low and high pressure valve members are preferably poppet valves.

Further optional features of the second aspect of the invention correspond to those discussed above in relation to the first aspect of the invention.

BRIEF DESCRIPTION OF THE DRAWINGS

The invention will now be illustrated with reference to the following Figures in which:

FIGS. 5 and 6 are alternative example embodiments of valve units, without pilot flow, according to the present invention.

FIG. 7 through 16 are alternative example embodiments of valve units, with pilot flow (hydraulic actuation), according to the present invention.

DETAILED DESCRIPTION OF EXAMPLE EMBODIMENTS

Figure 1:
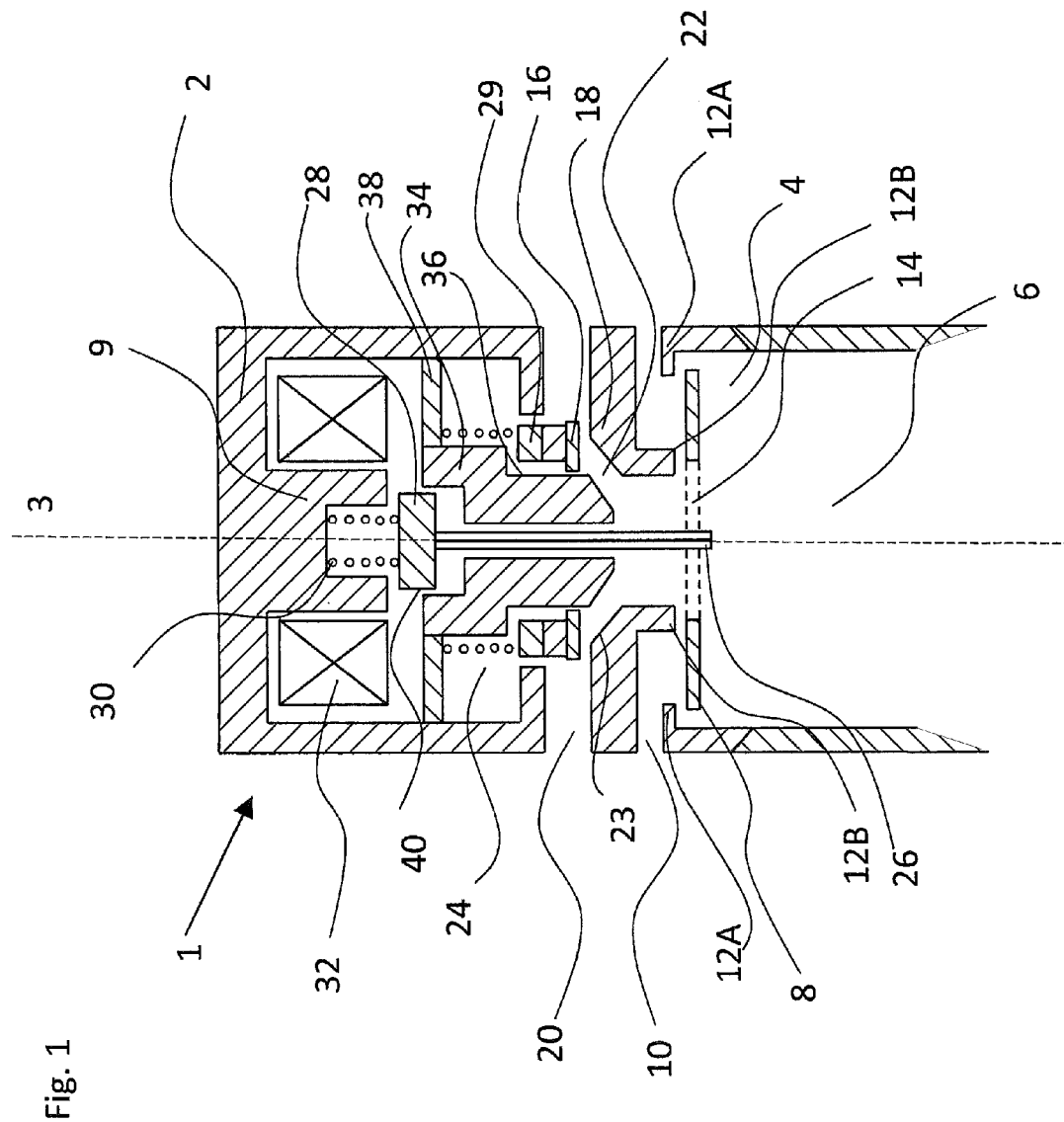
FIG. 1 is a cross-section through a first example of a valve unit according to the present invention.

FIG. 1 is a cross section through a first example embodiment of a valve unit 1. The valve unit has an elongate body 2 formed from magnetic material (e.g. iron) and has a longitudinal axis 3. The valve body extends to an opening 4 (through which the valve body can be attached to a cylinder 6, functioning as the working chamber. Low pressure valve member 8 (functioning as the first valve member) is operable between an open position in which working fluid can flow through radially extending low pressure fluid conduit 10 to a low pressure manifold (the first working fluid line), and a closed position in which the annular valve member seals against inner and outer low pressure valve seats 12A, 12B, forming inner and outer circular seals.

The low pressure valve member further comprises an aperture 14 through which working fluid can flow between the working chamber and a high pressure valve comprising high pressure valve member 16 (functioning as the second valve member) and a circular high pressure valve seat 18. The high pressure valve member is operable between an open position in which working fluid can flow into or out of radially extending high pressure fluid conduits 20 to a high pressure manifold (the second working fluid line), and a sealed position in which the high pressure valve member seals against the high pressure valve seat, blocking fluid flow to or from high pressure manifold. Fluid passage 22 extends from the cylinder to the high pressure valve seat and the high pressure valve communicates with the cylinder through fluid passage 22 and aperture 14 even when the low pressure valve is closed. The high pressure valve and its seat can both fluidly communicate with the working chamber through the aperture 14 of the low pressure valve member. This fluid communication via the aperture is regardless of the open or closed state of the low pressure valve. When the low pressure valve is in the open state, some flow is likely to pass additionally around the periphery of the low pressure valve member (bypassing the aperture 14).

The high pressure valve member is biased to a closed position by spring 24. The low pressure valve is connected to an armature 28 (functioning as the (first) armature) by a connecting rod 26 (functioning as the connector) which extends through the high pressure valve member. Although for ease of design and manufacture it passes through the centre of the valve member this is not necessarily that case, and it may pass off-centre through the high pressure valve member. Spring 30 biases the armature towards the working chamber, biasing the low pressure valve to the open position. A solenoid 32 functions as the actuator, selectively providing a force on the armature in opposition to the spring force provided by spring 30.

The solenoid is coupled to the high pressure valve by way of a magnetic circuit which will be further described below, and to the low pressure valve by way of a magnetic circuit, and through armature 28 and connecting rod 26.

The high pressure valve member is made from a magnetic material such as iron. The low pressure valve member is not magnetic. An annular sealing piece 34 has an outer guide portion 36, along which the high pressure valve member slides during operation. The sealing piece 34 may additionally function as a guide for the connector and or the first valve member. The sealing piece 34 is typically made from a magnetic material and extends through the high pressure valve, and the connector 26 extends through the sealing member, thereby extending through the high pressure valve. An annular bridging piece 38 is formed from a non-magnetic material, and magnetic flux extends around the outer periphery and through the inner periphery of this annular bridging piece 38 during operation. Magnetic flux also extends through the bridging piece 38, however being non-magnetic it does not channel, or guide the flux, merely acting as a reluctance controlling gap.

When no current is supplied to the solenoid, the low pressure valve is biased to the open position by spring 30, and the high pressure valve is biased to the closed position by spring 24. During operation of a fluid working machine including the valve unit and working chamber, the solenoid is actuated at an appropriate point during a cycle of working chamber volume (thus providing an opening force on the high pressure valve, and a closing force on the low pressure valve). During a pumping cycle, energisation of the solenoid is typically performed around bottom dead centre (the point of maximum working chamber volume). During a motoring cycle this is typically just before top dead centre (the point of minimum working chamber volume), causing the low pressure valve to close. As the piston continues to top dead centre, a partial volume pumping cycle is executed, that is to say, the pressure in the working chamber is raised as the piston approaches top dead centre with both the low and high pressure valve sealed, the pressure equalises with that on the other side of the high pressure valve, and thus the high pressure valve moves open, no longer held closed by hydraulic pressure. (This is referred to as a partial volume pumping cycle as only a part (in this case a small part) of the maximum amount of working fluid, which can be displaced in a pumping cycle, is displaced). Magnetic flux passes through the valve body and the armature 28 producing a force on the armature, which acts towards the solenoid, urging the low pressure valve to a closed position. When the low pressure valve closes, the armature also moves closer to the solenoid.

Once the low pressure valve member has moved to seal the low pressure flow passages, the gap between the armature 28 and the valve body is small. Movement of the armature 28 may reduce a radial gap between the armature and the valve body, as well as an axial gap. The gap between the outer periphery 40 of the armature and the bridging portion 38 remains unchanged, and magnetic flux jumps across both gaps as if the bridge member 12, the armature and the valve body were single piece of metal. This has the effect of reducing the reluctance of the overall magnetic circuit through the valve body and armature. This has the effect of promoting a path for magnetic flux through the armature itself. This increases the force on the high pressure valve member which urges it towards a fully open position, away from the working chamber and upwards in each figure.

Accordingly, both the low pressure valve and the high pressure valve are actuated by a single actuator. In practice, there will be a delay between closure of the low pressure and opening of the high pressure valve, and the variation with time of the pressure in the working chamber will dictate the precise moment when the valves move.

This arrangement has several advantages. Firstly, the overall configuration is compact, with minimal dead volume due to the close proximity of the low and high pressure valves. The armature 28 is close to the solenoid, minimising magnetic losses. The low pressure connection is closer to the working chamber and therefore to the machine crank case (not shown).

Figure 2:
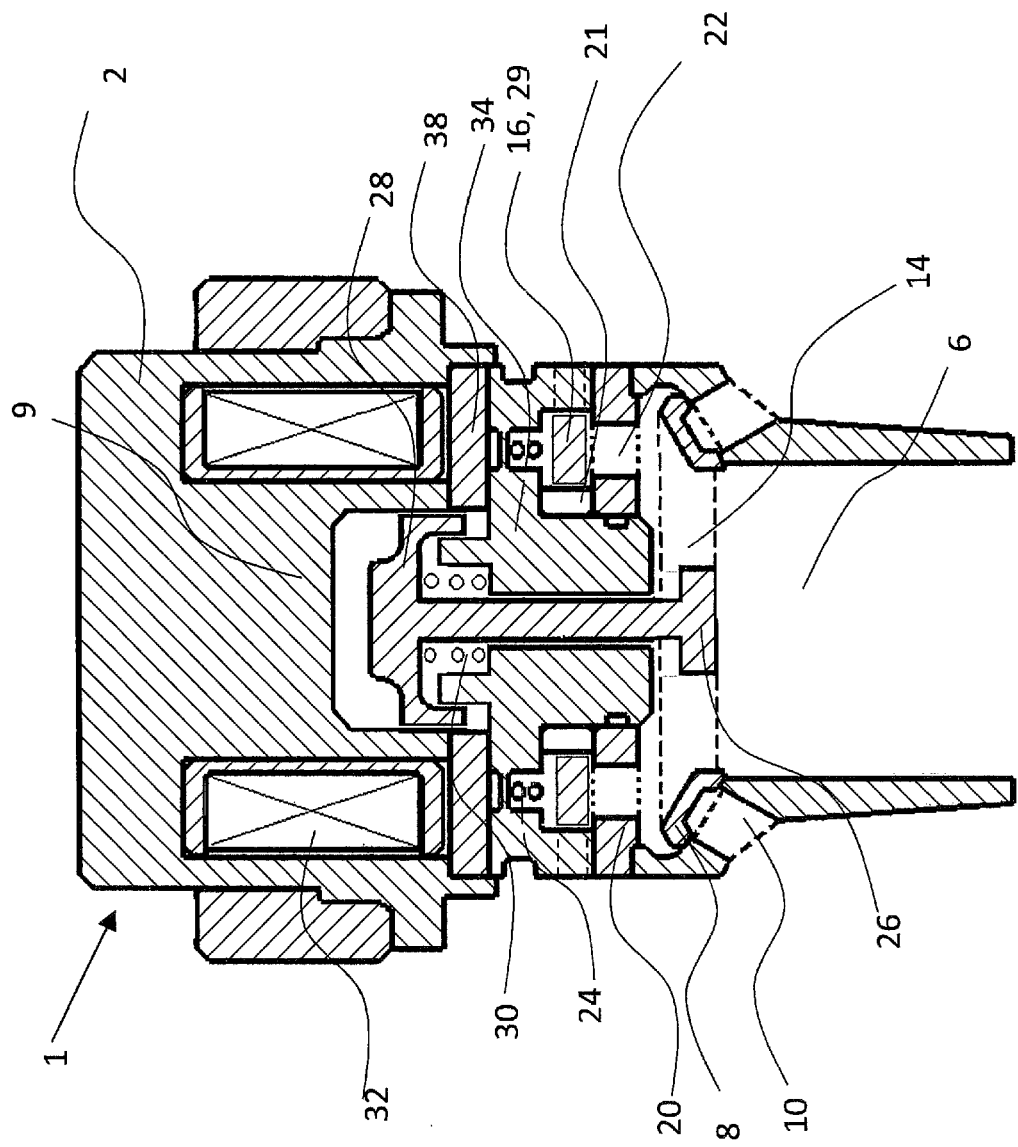
FIG. 2 is a cross-section through a second example of a valve unit according to the present invention.

FIG. 2 is a cross-section through a second example embodiment which generally corresponds to the first example. Corresponding features are labelled accordingly. In this case, the low pressure valve is again biased open but this time seals by movement away from the actuator, towards the working chamber. When a current is passed through the solenoid, the low pressure valve is urged closed.

Instead of the spring 30 acting on the armature 28 being connected to the solenoid core 9, it is instead connected between to the other side of the armature (the side away from the armature) and the annular sealing piece 34. The low pressure valve remains an 'energise to close' valve because the low pressure valve member is adapted to seat in the opposite direction towards the working chamber. Alternatively, the spring 30 may be located elsewhere, connected to a stationary part (valve body, or some part connected to the valve body), acting on some part connected to the armature (e.g. the central underside of the valve member, somehow linked to the annular valve member).

As the axial overlap between the annular sealing piece 34 and the armature 28 increases, so the reluctance decreases. This functions in the same way as for the first embodiment, so a path for magnetic flux through the low pressure armature is promoted, and this promotes increasing force acting on an armature 29 of the high pressure valve member (functioning as the second armature), causing subsequent motion of the high pressure valve member.

Although described as a distinct armature and high pressure valve member, it will be apparent to those skilled in the art that there might be a single piece component constituting both parts, or two distinct components joined together.

The high pressure valve member seals axially, and is guided radially. The guidance may be such that it is permitted to tilt to an extent relative to the axis of the seat, without jamming (becoming lodged, due to high friction). The guidance may be on a radially inwards or radially outwards side of the valve member. The guiding side of the valve member may be shaped with a particular profile, such as an arcuate, spherical, combination spherical, or part-spherical profile, so that when the valve is angled, the interfering contact between the profile and the abutting surface (internal or external) is smooth or rounded or smoothly rounded and does not present a sharp profile (which would be more likely to engage and result in a high friction interface promoting jamming). The flat surface of the face of the high pressure valve member seals against the drillings 22 which lead to the working chamber. A non-magnetic guide of annular form is shown, the external surface 36 of which serves as an internal guide to the high pressure valve member. It is non-magnetic, so as to encourage flux flow from axial faces of the high pressure valve member/high pressure (second) armature 29. Alternatively, the high pressure valve member may slide within an external guide. Guides and guidance may also seek to centralise the respective valve member.

Although annular sealing piece 34 is drawn as a single component, it could alternatively be formed from more than one part (e.g. a split between the radially inner mass, and radially outer mass).

Figure 3:
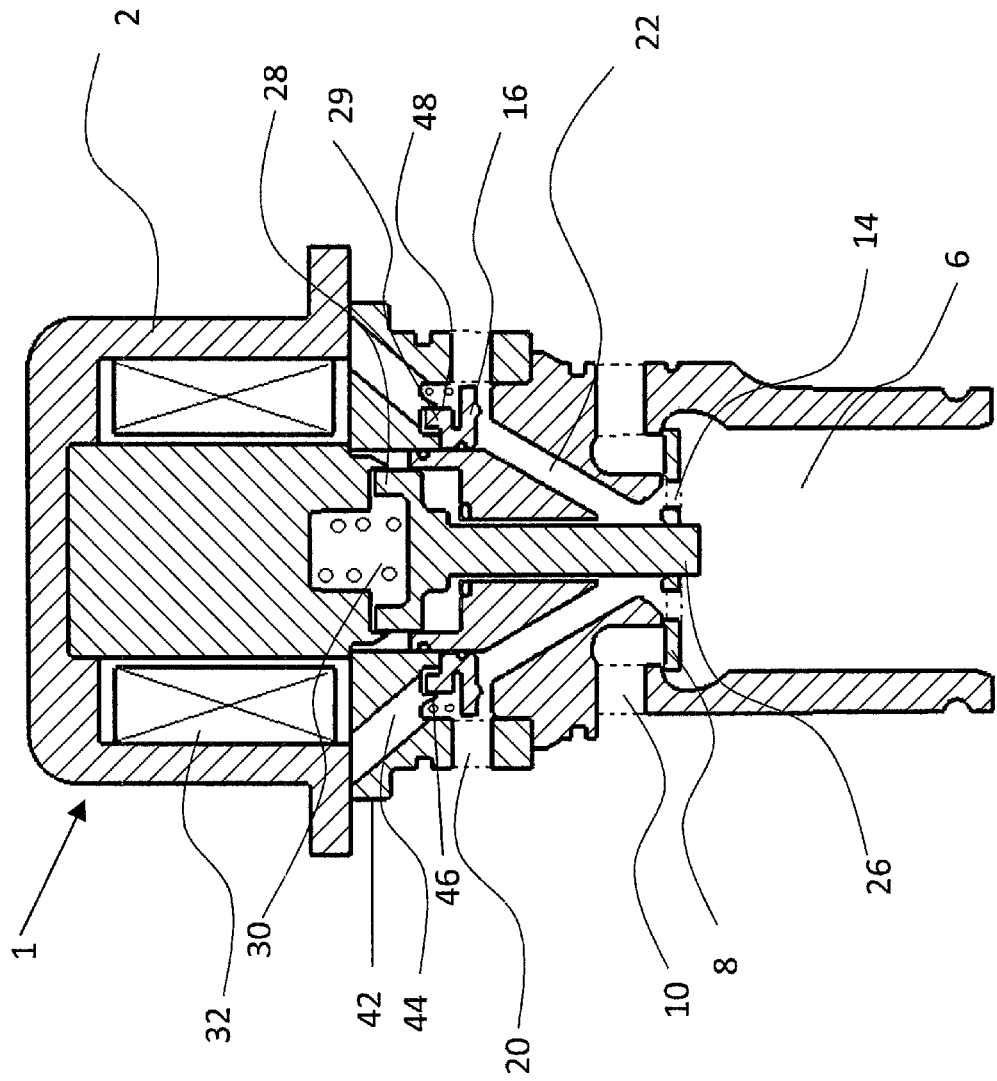
FIG. 3 is a cross-section through a third example of a valve unit according to the present invention.

FIG. 3 is a cross section through a further example embodiment of a valve unit 1. In the embodiment of FIG. 3, non-magnetic material 42, which forms the outer layer of the valve body contains inserts 44 of magnetic material. This arrangement is manufactured by drilling non-magnetic material and pressing rods of magnetic material into the resulting bores. The end of the rods facing the high pressure valve is initially unfinished and is only finally machined once it is in place within the non-magnetic material. This allows the valve facing surface of the magnetic inserts to be carefully shaped to form tapering protuberances 46 adjacent radially facing surface or surfaces 48 of the high pressure valve member to enable proportional magnetic control of the armature 29 connected to the high pressure valve. The magnetic inserts may be located close enough to one another such that the gaps are small, and the magnetic flux within one insert may influence and complement that in the circumferentially adjacent inserts.

Figure 4:
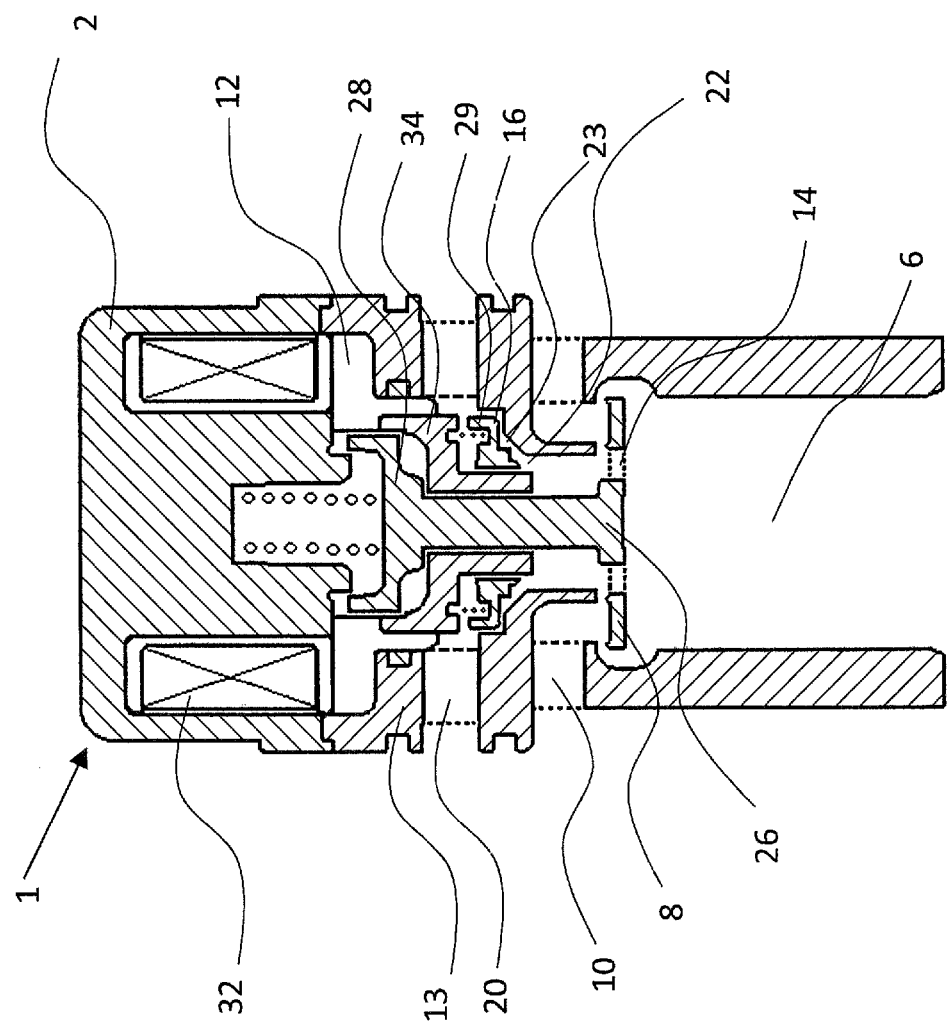
FIG. 4 is a cross-section through a fourth example of a valve unit according to the present invention.

FIG. 4 is a cross section through a further example embodiment of a valve unit 1. In the embodiment of FIG. 4, the magnetic circuit extends from the valve body through the high pressure valve seat 23 and the high pressure valve member 16 and high pressure armature 29 (in current embodiment the high pressure armature 29 is located at the outer periphery of the high pressure valve member, functioning as the armature of the second valve member), to the annular sealing piece 34. The valve body has a capsule 13 which is typically made of magnetic material. The high pressure valve member 16 is slidably mounted on a guiding portion 25, located around the connector 26. The above magnetic path via the armature passes predominantly radially, and the magnetic attraction for lifting the high pressure valve acts predominantly axially between the high pressure armature 29 and the annular sealing piece 34. As the low pressure armature 28 moves away from the working chamber, so the overlap of the magnetic component increases, reducing the reluctance in the circuit. This increases the magnetic flux available to move the high pressure armature 29 and valve member.

FIG. 5 is a cross section through a further example embodiment of a valve unit 1. The embodiment of FIG. 5 has an alternative magnetic circuit configuration including an armature 157 (functioning as the (first) armature) which moves with rod 26, without annular sealing piece 34, a flux bridge 175 and a magnetic portion 180 of the high pressure valve member which functions as an armature (the second armature).

FIG. 6 is a cross section through a further example embodiment of a valve unit 1. In the embodiment of FIG. 6, when current is passed through the solenoid and a force is consequently applied to the armature 157, 28, the low pressure valve moves up (to a closed position) first. Energisation of the solenoid causes the high pressure valve member to be drawn open by attraction to the armature (in contrast to the embodiment of FIG. 5 where axial force is due to attraction towards flux bridge 175). A remaining fluid gap 156 means that the high pressure valve member will follow once pressure has equalised across the combined armature/high pressure valve member. Note that the low pressure 10 and high pressure 20 drill ways are not interleaved.

In the embodiment of FIGS. 5 and 6, there is no pilot flow through the connecting rod 26. It is hollow so as to avoid developing a pressurized region above, and therefore allows unrestricted motion of the rod irrespective of cylinder pressure.

FIG. 7 is a cross section through a further example embodiment of a valve unit 1, and illustrates a design with a pilot stage and includes a pilot component 157. When low pressure poppet/moving pole moves up, a pilot stage is opened through the connecting rod before high pressure poppet moves up. The rod has radial drillings 160, for pilot flow, embodying a spool valve arrangement with high pressure member. The pilot flow path opens when the low pressure valve is closed, while the high pressure valve remains closed. Pressure in intermediate region 158 (functioning as the chamber) is equalised slowly via the pilot flow. Therefore initially there will be a pressure imbalance between the cylinder pressure, the high pressure conduit 20 pressure, and intermediate region 158.

At the end of a motoring cycle (in which pressurised hydraulic fluid is received from the high pressure line, used to do work, and then vented to the low pressure line): the piston downstroke must be sufficiently fast to reduce pressure in the working chamber whilst high pressure flow enters the working chamber via the pilot flow, sufficient that the low pressure valve is able to overcome pressure force.

FIG. 8 is a cross section through a further example embodiment of a valve unit 1, and illustrates an embodiment with a more controllable pilot stage. In contrast with previous embodiments, the armature 28/pilot component 157 in the figure, is not rigidly connected to the connecting rod, but is slidably mounted on the connecting rod and allowed limited axial motion. Motion is limited at one extent by a change in the external diameter of rod, and at the other extent by an end stop protruding from the rod. Alternately, instead of a dual diameter rod, there could simply be a second end stop component. The moving pole/sliding armature 157/200, can slide on the poppet rod. After the low pressure valve closes, a small fluid gap through the connecting rod provides the pilot flow path, connecting chamber 158 to the working chamber through a conduit 205 extending through the connecting rod. The upper moving pole (the (first) armature) lifts off the step on the rod to open the pilot stage. (Pilot flow can later be stopped by switching off the current to the solenoid causing the armature 157 to descend and obscure the pilot flow drillings).

The embodiment of FIG. 8 may have operational advantages, for example when it is used to control a wheel motor. If a pressurised cylinder needs to be depressurised without piston movement, for example to change the output torque direction, when the current is turned off, the pilot flow is stopped. This contrasts with the arrangement of FIG. 7 in which pressure in the cylinder keeps the low pressure valve in a closed position, and so even if the high pressure valve is closed, the chamber is still connected to the high pressure line, through the pilot stage, and so pressure in the working chamber can never be decreased (unless the piston moves down sufficiently quickly). In the embodiment of FIG. 8, when the solenoid is switched off, the armature 28/157/200 moves down, closing the pilot stage after which pressure in the working chamber will start to decrease due to leakage, allowing the low pressure valve to open.

FIG. 9 is a cross section through a further example embodiment of a valve unit 1, and illustrates a first design which uses hydraulic pressure difference to assist high pressure valve member motion. Flow of hydraulic fluid into the space above the high pressure valve (i.e. on the side facing the solenoid, away from the working chamber) is restricted by restriction 153 (shown as a radial clearance) so that pressure above high pressure valve drops when the pilot opens. This means that the main high pressure valve can open when pressure in the working chamber is less than the pressure in the high pressure line.

The radial clearance (identified by ringed region 153 in FIG. 9), which extends around the high pressure armature (within the body/flux bridge) acts as a fluid impedance from the high pressure fluid conduit to the intermediate region 158. There is therefore a pressure imbalance on the high pressure member providing an upwards force assisting opening of the high pressure valve.

FIG. 10 is a cross section through a further example embodiment of a valve unit 1, and illustrates a second design with hydraulic actuation. The magnetic circuit only acts on a single armature 200 so it can be easily optimised. The armature and low pressure valve move up (towards the solenoid, away from the working chamber), connecting the upper chamber to the low pressure line. The hydraulic cup member 162 is rigidly connected to the rod, and thus to the low pressure poppet. The pressure difference urges the low pressure connecting rod and low pressure valve member to close the low pressure valve, and then urges the high pressure poppet valve. In the position shown when the spool valve is open, fluid flows out of the intermediate region at the further low pressure connection 154 (which functions as a sink for hydraulic fluid), but because of restriction 153, the pressure in the intermediate region is lower than the pressure in the HP conduit. This provides a force to open the HP valve, in addition to the magnetic force.

When the armature moves up, the pilot stage is open, draining pressure in the intermediate region via the low pressure port 154. Pressure in the intermediate chamber (functioning as the chamber) will be lower than the pressure in the high pressure conduit. This pressure difference acts on the annular region 163, thus causing the low pressure valve to close. The pressure in the intermediate region is lower than the cylinder pressure and the high pressure conduit, thus causing a net upward force on the HP valve member.

FIG. 11 is a cross section through a further example embodiment of a valve unit 1, and illustrates a third design with hydraulic actuation. The poppet pistons have a reduced diameter and so they move more quickly. In operation, the armature 157, 200 moves up along the rod, drillings 160 in the connecting rod are opened, which connects low pressure port 154 to control chamber 152. The pressure in the chamber (functioning as the chamber) equalises with that at the low pressure port and high pressure in region 168 causes the low pressure valve to close (because the net upwards forces on the low pressure valve acts upwards).

As with valves of previous Figures, the opening action of the high pressure valve is assisted by a partial volume pumping cycle, so that the net force on the high pressure valve member is upwards.

FIG. 12 is a cross section through a further example embodiment of a valve unit 1, and illustrates a fourth design with hydraulic actuation. A control chamber 152 (functioning as the chamber) connects to the low pressure line via a radial drill-way and so an additional low pressure connection for each valve unit is not required. This valve is similar to that shown in FIG. 11, however the flow passages opened by armature 157 connect directly to the low pressure conduit via drillings 155. The operation is the same as in FIG. 11, other than the presence of fluid path to 154 through the centre of the rod, which is instead replaced by the fluid path as described above.

Whereas the armature of FIG. 11 rests on the rod, and thus the spring 30 acts to push both components in downwards direction, the arrangement of FIG. 12 is such that separate springs act on the individual valve components. Spring 30 acts on armature, spring 210 acts on the rod, and spring 24 acts on the high pressure valve poppet.

FIG. 13 is a cross section through a further example embodiment of a valve unit 1. This embodiment is a variation on the embodiment of FIG. 12 in which there are three components within the high pressure poppet valve. A sleeve component 185 moves away from the working chamber, due to net upwards fluid force, to open a pilot stage through holes in rod 160.

It should be noted that the armature 157 associated with the low pressure valve member seals hydraulically, in respect of the drillings 155 which connect to low pressure gallery. The sleeve rests on the end stop 159, causing the rod and thus the low pressure valve member to move up into the closed position. The pilot flow passages are also opened as the sleeve moves up relative to the rod. Again, to open the high pressure valve member, a part pump can be used.

FIG. 14 is a cross section through a further example embodiment of a valve unit 1. The direction of actuation is reversed, and a pilot component seals with a pintle. It should be noted that the armature 157 associated with the low pressure valve member does not seal any passages/drillings hydraulically. Opening the pintle allows pressure equalisation to take place between the region 154 and the region around the rod (springs 24/30 are here).

FIG. 15 is a cross section through a further example embodiment of a valve unit 1, and illustrates a design in which an internal chamber is connected to the low pressure line via internal drilling 155, and closely resembles the valve of FIG. 14 except that the low pressure fluid source which the pintle connects to is the low pressure conduit 10.

FIG. 16 shows a variation of this in which the pilot component is pressure balanced for more flow. It also incorporates a wheel motor valve (by this is meant a valve which provides means to enable the cylinder to be pressurised when the shaft is at rest, even with a particularly large high pressure conduit pressure). Control chamber 152 is sealed by actuator poppet valve 150 when the solenoid is not activated. The actuator poppet valve slides on a guide 140 and the sealing diameter of the conical surface of the actuator poppet valve is selected to match the diameter of guide 140 so that it requires only a small force to move poppet valve 150 against a pressure differential. This reduces the force which the armature 157 must exert, enabling the armature size to be reduced and the switching speed increased. This also allows the diameter of the port which is selectively sealed by the actuator poppet valve to be larger than in the pintle design above.

Again, the control chamber is by default sealed but is brought into fluid communication with a fluid connection 154 to the low pressure line (functioning as a sink for hydraulic fluid). A series of axial drillings 220 allow hydraulic fluid to pass through guide 140.

In operation, actuation of the solenoid pushes armature 157 down, which in turn pushes actuator poppet 150 down which compresses spring 145. This same spring closes the fluid path when the solenoid is de-energised. Movement of 150 downwards drains the control chamber 152. Subsequently, the connecting rod, and therefore the low pressure valve, moves upwards subject to the net upwards fluid force, arising in part from high pressure fluid in an annular region 163 around the rod, bearing upwards on an increased diameter region of the rod.

When the connecting rod reaches its end stop (i.e. when the low pressure poppet seals), the check ball experiences a lower pressure above (because check ball receiving region 235 is fluidly connected to low pressure connection 154 acting as low pressure sink via control chamber 152) and a higher pressure below (where it is in fluid communication with the high pressure conduit), and thus the ball is unseated. The unseating of the ball allows fluid from the high pressure conduit to enter the cylinder working chamber via the drillings 160 along the axial drilling in the rod. When the cylinder pressure has increased, the main high pressure valve member moves upwards due to net force, thus connecting the high pressure conduit to the cylinder.

For closure, the current to the solenoid is switched off, the armature 157 moves upwards, as does the poppet valve 150 in chamber 152 and the pressure in the control chamber increases. Springs 24, 130 and 145 push components back to their default positions (with the high pressure valve closed, and the low pressure valve open).

The check ball 151 may be replaced by another check valve mechanism.

The design allows pressure in the working chamber to be increased without the piston moving. This is for example useful in a vehicle, where the vehicle may be stationary with zero shaft speed and thus a stationary piston. Essentially, the shaft may be allowed to stop and start, without the need for a supplementary mechanism to restart.

Further variations and modifications may be made within the scope of the invention herein disclosed.

LIST OF FEATURES

1 Valve unit.
2 Valve body
3 Longitudinal axis
4 Opening
6 Cylinder (working chamber)
8 Low pressure valve member (first valve member)
9 Solenoid core
10 Low pressure fluid conduit
12A, 12B Inner and outer low pressure valve seats (first valve seats)
13 Capsule
14 Aperture
16 High pressure valve member (second valve member)
18 High pressure valve seat (second valve seat)
20 High pressure fluid conduit
21 Non-magnetic guide
22 Fluid passages/drillings
23 Portion of the valve body through which the fluid passage 22 passes
24 Spring (for high pressure valve member)
26 Connecting rod
28 Armature (for low pressure valve, the (first) armature)
29 Armature (for high pressure valve, the second armature)
30 Spring (for low pressure valve member/for connecting rod)
32 Solenoid (actuator)
34 Annular sealing piece
36 Outer guide portion
38 Annular bridging piece
40 Outer periphery of low pressure armature
42 Non-magnetic material
44 Insert of magnetic material
46 Protuberance
48 Radially facing surface
140 Guide for actuator poppet (balanced)
145 Spring for Actuator poppet (balanced)
147 Pintle (Pilot needle)
150 Actuator poppet (balanced)
151 Wheel motor pilot (ball)
152 Control chamber
153 Restriction
154 Further low pressure fluid connection
155 Drill way
156 Fluid gap
157 Pilot component ((first) armature associated with pilot valve)
158 Intermediate region
159 Rod end stop
160 Pilot drillings
161 Pilot flow
162 Hydraulic cup member
163 Annular surface region
164 Cup drillings
168 Rod return spring
169 Pilot spring
170 Check ball spring
175 Flux bridge
180 Armature part of high pressure valve member
185 Spring abutment portion of rod
190 Pilot flow path
195 Connecting rod guide
200 Sliding (first) armature
205 Conduit
210 Spring
220 Series of axial drillings
225 Drillings in rod
235 Check ball receiving region of connecting rod

The invention claimed is:

1. A valve unit for regulating the flow of working fluid between a working chamber of a fluid working machine and both a first working fluid line and a second working fluid line, the valve unit comprising:
  a first valve comprising a first valve member and one or more cooperating first valve seats,
  a second valve comprising a second valve member and one or more cooperating second valve seats,
  an actuator, which is actuatable to apply a force to urge the first valve member away from or towards the one or more first valve seats and a force to urge the second valve member away from or towards the one or more second valve seats,
  a coupling between the actuator and the first valve member,
  wherein the coupling comprises a connector which extends at least partially through the second valve member.

2. A valve unit according to claim 1, further comprising an opening in the valve unit through which the first valve and the second valve can communicate with a working chamber, and wherein the first valve member comprises an aperture through which the second valve can communicate with the opening when the first valve member is in sealing contact with the one or more first valve seats.

3. A valve unit according to claim 1, wherein the second valve member is located intermediate the first valve member and the actuator.

4. A valve unit according to claim one, wherein the actuator is a solenoid actuator.

5. A valve unit according to claim 4, wherein the second valve member comprises magnetic material and is magnetically coupled to the solenoid actuator such that when current is passed through the solenoid actuator, magnetic flux from the solenoid actuator passes through the second valve member and an opening or closing force is thereby exerted on the second valve member.

6. A valve unit according to claim 4, wherein the solenoid actuator acts on an armature, the armature is connected to the first valve member by a connector which extends through the second valve member, and the armature is magnetically coupled to the solenoid actuator such that when current is passed through the solenoid actuator, magnetic flux from the solenoid actuator passes through the armature and an opening or closing force is thereby exerted on the first valve member through the connector.

7. A valve unit according to claim 4, wherein the solenoid actuator acts on an armature, the armature is coupled to a hydraulically actuated member through a hydraulic pressure operated coupling, and the hydraulically actuated member is coupled to the first valve member by the connector.

8. A valve unit according to claim 7, comprising a chamber defining a volume containing hydraulic fluid, the chamber being defined in part by a surface of the hydraulically actuated member, the hydraulically actuated member being slidably mounted, whereby movement of the armature responsive to actuation by the solenoid leads to a change in hydraulic pressure within the chamber and a consequent movement of the hydraulically actuated member.

9. A valve unit according to claim 8, wherein the chamber is in communication with a sink or source for hydraulic fluid through a valve and the armature is slidable responsive to actuation by the solenoid to open the valve, to thereby cause hydraulic fluid to enter or leave the chamber and a pressure differential to develop across the hydraulically actuated member.

10. A valve unit according to claim 9, wherein the valve is a pilot valve and the sink or source for hydraulic fluid comprises a conduit extending through the connector to an opening of the valve unit.

11. A valve unit according to claim 7, wherein the solenoid actuator acts on an armature and the armature is coupled to the second valve member through a hydraulic pressure operated coupling.

12. A valve unit according to claim 11, wherein the second valve member is slidably mounted and has a surface in communication with a chamber containing hydraulic fluid, wherein movement of the armature causes a change in the pressure of hydraulic fluid in the chamber, the change in pressure causing said urging of the second valve member away from or towards the one or more second valve seats.

13. A valve unit according to claim 7, wherein the second valve member is slidably mounted and has a surface in fluid communication with a chamber containing hydraulic fluid, wherein movement of the first valve member or the connector causes a change in the pressure of hydraulic fluid in the chamber, the change in pressure in turn urging the second valve member away from or towards the one or more second valve seats.

14. A valve unit according to claim one, wherein the one or more first and one or more second valve seats are coaxial.

15. A valve unit according to claim one, wherein the first and/or second valve member has two valve seats, which seal a port or ports lying between the two seats.

16. A valve unit according to claim one, wherein the first and second valve members are located within the valve unit.

17. A valve unit according to claim one, comprising one or more flow passages extending at least in part in an outwards direction, for coupling one or more first valve seats to a hydraulic line and/or one or more radially outwards extending flow passages for coupling one or more second valve seats to a hydraulic line.

18. A valve unit according to claim one, wherein the first valve member is an annular valve and the one or more first valve seats are an annular valve seat and the annular first valve member and the annular valve seat are configured to together define inner and outer sealing lines extending around the periphery of the annular first valve member and the annular valve seat when the annular first valve member is in sealing engagement with the annular valve seat.

19. A valve unit according to claim one, configured such that actuation of the actuator causes the first valve to open or close and subsequently causes the second valve to open or close.

20. A valve unit according to claim 19, wherein opening or closure of the first valve causes the forces exerted by the actuator on the second valve member, whether directly or indirectly, to increase to thereby facilitate subsequent opening or closing of the second valve.

21. A valve unit according to claim one, wherein the connector extends through the second valve member.

22. A valve unit according to claim one, wherein the connector comprises a hydraulic connector.

23. A fluid working machine comprising a low pressure line, a high pressure line, a working chamber, and a valve unit according to any one preceding claim, wherein the first and second valves are in fluid communication with the working chamber and the first and second valve seats are coupled to the low and high pressure lines respectively to thereby regulate the flow of working fluid between the working chamber and the low and high pressure lines.

24. A fluid working machine according to claim 23, wherein the value unit further comprises an opening in the valve unit through which the first valve and the second valve communicate with the working chamber, and wherein the first valve member comprises an aperture through which the second valve can communicate with the working chamber when the first valve member is in sealing contact with the one or more first valve seats.

\* \* \* \* \*